(12) United States Patent
Ono et al.

(10) Patent No.: US 11,598,624 B2
(45) Date of Patent: Mar. 7, 2023

(54) FEEDING DEVICE OF HOLE INSPECTION DEVICE

(71) Applicant: SUBARU CORPORATION, Tokyo (JP)

(72) Inventors: Ryohei Ono, Tokyo (JP); Masao Watanabe, Tokyo (JP); Tatsuo Nakahata, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/221,193

(22) Filed: Apr. 2, 2021

(65) Prior Publication Data

US 2021/0354208 A1 Nov. 18, 2021

(30) Foreign Application Priority Data

May 18, 2020 (JP) .............................. JP2020-087045

(51) Int. Cl.
*G01B 5/00* (2006.01)
*B23Q 17/24* (2006.01)
*G01B 21/04* (2006.01)
*B23B 49/00* (2006.01)
*B23B 49/02* (2006.01)

(52) U.S. Cl.
CPC ........... *G01B 5/0004* (2013.01); *B23Q 17/24* (2013.01); *G01B 21/047* (2013.01); *B23B 49/001* (2013.01); *B23B 49/02* (2013.01)

(58) Field of Classification Search
CPC ....... G01B 5/12; G01B 5/0004; G01B 21/047
USPC .................................. 33/542, 543, 546, 549
See application file for complete search history.

(56) References Cited

U.S. PATENT DOCUMENTS

| 4,266,346 | A | * | 5/1981 | Olschefski | ............... | G01B 7/12 |
|           |   |   |        |            |                | 33/550 |
| 4,572,715 | A |   | 2/1986 | Wolff |  |  |
| 4,574,487 | A | * | 3/1986 | Meyer, Jr. | ............... | G01B 3/46 |
|           |   |   |        |            |                | 33/544.5 |
| 4,884,346 | A | * | 12/1989 | Cook | ....................... | G01B 7/13 |
|           |   |   |        |            |                | 33/783 |

(Continued)

FOREIGN PATENT DOCUMENTS

| EP | 1 797 813 A1 | 6/2007 |
| FR | 2 662 3 82 A1 | 11/1991 |
| JP | 2014-115144 A | 6/2014 |

OTHER PUBLICATIONS

Extended European Search Report dated Sep. 20, 2021 for European Patent Application No. 21168156.4 (9 pages).

*Primary Examiner* — George B Bennett
(74) *Attorney, Agent, or Firm* — Smith, Gambrell & Russell, LLP

(57) ABSTRACT

According to one implementation, a feeding device of a hole inspection device having a probe includes an attaching jig, a movement mechanism, and a positioning jig. The probe is inserted into a hole to be inspected of an object in a central axis direction of the hole, for inspecting the hole. The attaching jig attaches the hole inspection device to the feeding device. The movement mechanism linearly reciprocates the hole inspection device together with the attaching jig. The positioning jig positions the movement mechanism to the object. A moving direction of the attaching jig and the hole inspection device is made parallel to the central axis direction of the hole by positioning the movement mechanism.

20 Claims, 7 Drawing Sheets

(56) References Cited

U.S. PATENT DOCUMENTS

| | | | | |
|---|---|---|---|---|
| 5,657,550 | A * | 8/1997 | Struble | G01B 5/14 33/544.4 |
| 5,987,765 | A * | 11/1999 | Sola | G01B 5/008 33/549 |
| 6,298,570 | B1 * | 10/2001 | Maughan | G01B 5/146 33/549 |
| 7,958,587 | B1 * | 6/2011 | Hansen | B08B 9/00 15/23 |
| 8,448,346 | B2 * | 5/2013 | Ketelaar | G01B 3/22 33/549 |
| 10,036,622 | B2 * | 7/2018 | Myers | G01B 3/22 |
| 10,753,727 | B2 * | 8/2020 | Klose | G01B 21/047 |
| 11,300,526 | B2 | 4/2022 | Ono et al. | |
| 11,383,338 | B2 | 7/2022 | Watanabe et al. | |
| 2007/0153296 | A1 | 7/2007 | Schick | |
| 2014/0054053 | A1 * | 2/2014 | Saito | B23Q 5/326 173/1 |
| 2016/0341545 | A1 | 11/2016 | Yamazaki et al. | |
| 2017/0023345 | A1 * | 1/2017 | Myers | G01B 5/12 |
| 2019/0030623 | A1 * | 1/2019 | Ono | B23B 49/023 |
| 2022/0099427 | A1 * | 3/2022 | McMath | G01B 5/12 |
| 2022/0234121 | A1 * | 7/2022 | Watanabe | B23B 51/08 |

* cited by examiner

//  FEEDING DEVICE OF HOLE INSPECTION DEVICE

CROSS REFERENCES TO RELATED APPLICATIONS

This application is based upon and claims the benefit of priority from Japanese Patent Application No. 2020-87045, filed on May 18, 2020; the entire contents of which are incorporated herein by reference.

FIELD

Implementations described herein relate generally to a feeding device of a hole inspection device, a hole inspection unit and a method of feeding a hole inspection device.

BACKGROUND

When a hole was processed on an object by a drilling tool, such as a drill, it is sometimes necessary to inspect a feature, such as surface roughness of the inside surface of the processed hole or a three dimensional shape of the processed hole. As a method of measuring surface roughness of the inside surface of a hole or a shape of the hole, a contact measuring method, in which a contact-type probe is moved while contacting the probe on the inside surface of the hole, and a non-contact measuring method, in which the inside surface of the hole is irradiated with laser light and interference light is analyzed, are known (for example, refer to Japanese Patent Application Publication JP 2014-115144).

The conventional method of inspecting a feature of a hole requires to set an object having the hole to be inspected at a right position in a three dimensional measuring device or the like. Accordingly, when the object has been drilled by a handheld drilling device, the feature of the hole cannot be inspected promptly. In particular, when the size of the object to be drilled is too large to set in a three dimensional measuring device or the like, when the drilled object is conveyed for the following process while being fixed to a jig, and when cutting, surface treatment, assembling or the like is subsequently performed to the drilled object, an inspection of the hole itself is difficult.

That is, when an object having a hole to be inspected cannot be moved easily, it is difficult to inspect a feature of the hole. As a result, in case of inspecting surface roughness of a hole, there is no choice but to adopt an inspection method in which an inspector compares the surface roughness of the hole with that of a sample by the sense of touch.

Accordingly, an object of the present invention is making it possible to inspect a feature, such as surface roughness and/or a shape, of a hole to be inspected without setting an object having the hole on a measuring device.

SUMMARY OF THE INVENTION

In general, according to one implementation, a feeding device of a hole inspection device having a probe includes an attaching jig, a movement mechanism, and a positioning jig. The probe is inserted into a hole to be inspected of an object in a central axis direction of the hole, for inspecting the hole. The attaching jig attaches the hole inspection device to the feeding device. The movement mechanism linearly reciprocates the hole inspection device together with the attaching jig. The positioning jig positions the movement mechanism to the object. A moving direction of the attaching jig and the hole inspection device is made parallel to the central axis direction of the hole by positioning the movement mechanism.

Further, according to one implementation, a hole inspection unit includes the above-mentioned feeding device and the above-mentioned hole inspection device.

Further, according to one implementation, a method of feeding a hole inspection device having a probe, for inspecting a hole to be inspected of an object by inserting the prove in a central axis direction of the hole, includes: attaching the hole inspection device to an attaching jig; positioning a movement mechanism to the object by a positioning jig; and feeding the hole inspection device by linearly advancing the attaching jig together with the hole inspection device toward the object by the movement mechanism. The movement mechanism linearly reciprocates the hole inspection device together with the attaching jig. A moving direction of the attaching jig and the hole inspection device are made parallel to the central axis direction of the hole by positioning the movement mechanism.

DETAILED DESCRIPTION

A feeding device of a hole inspection device, a hole inspection unit and a method of feeding a hole inspection device according to implementations of the present invention will be described with reference to the accompanying drawings.

(First Implementation)
(Structure and Function)

Figure 1:
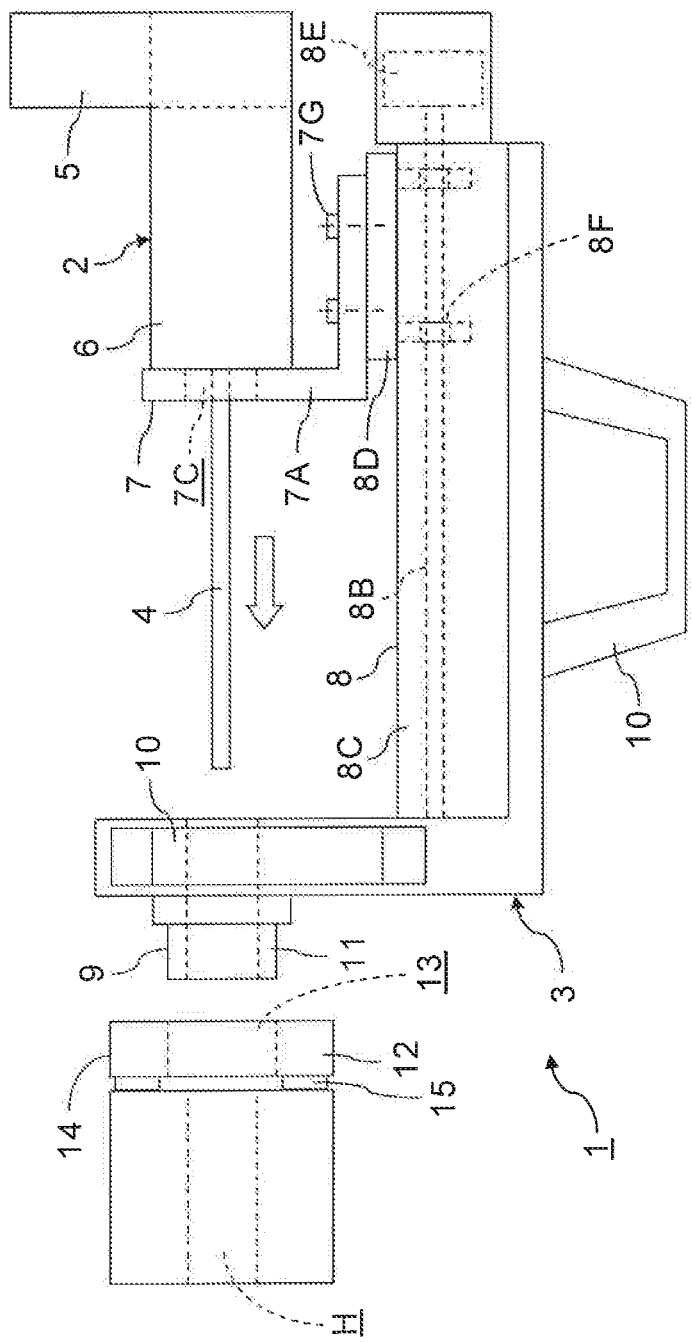
FIG. 1 is a front view of a hole inspection unit according to the first implementation of the present invention.
Figure 2:
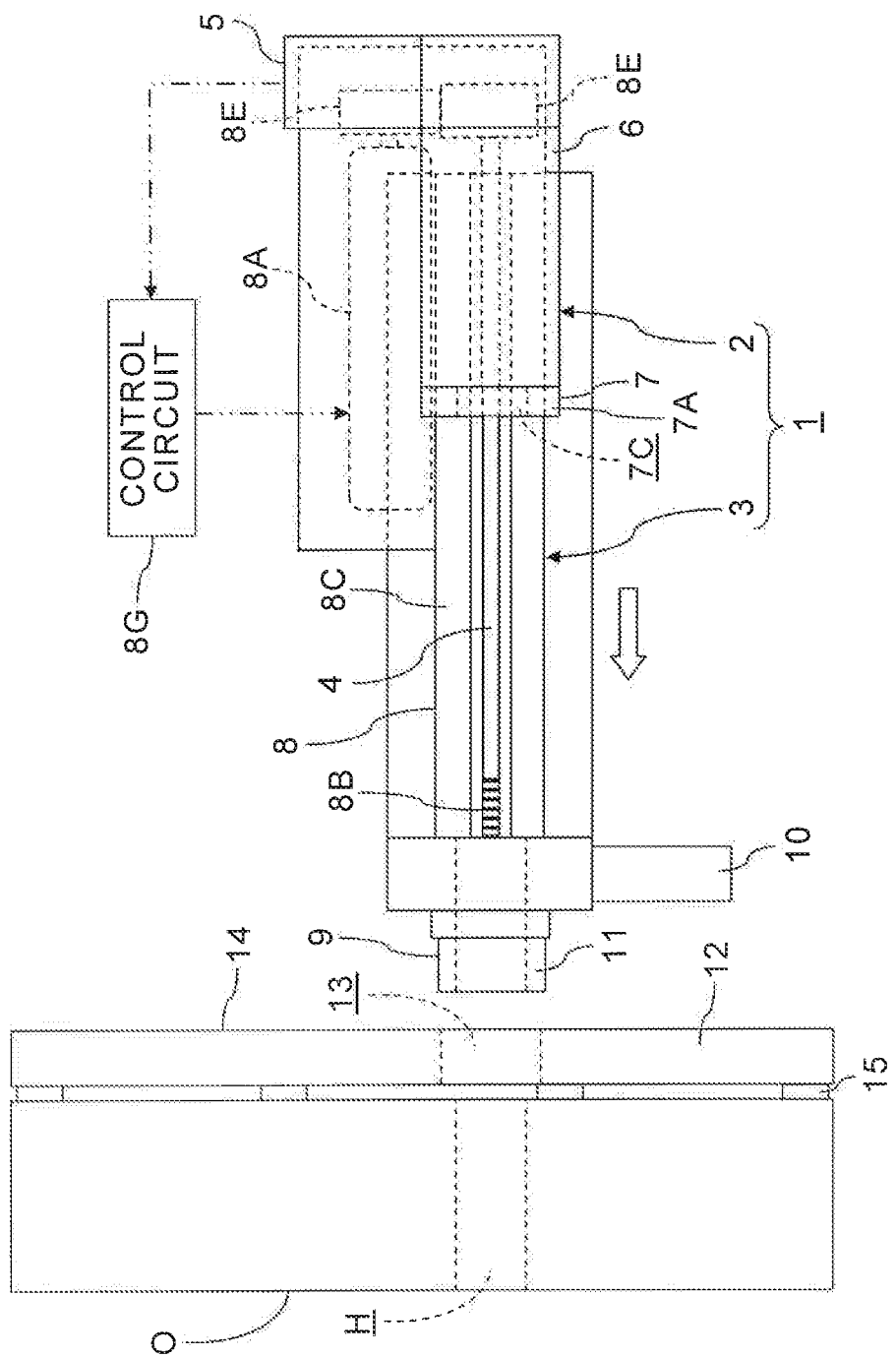
FIG. 2 is a top view of the hole inspection unit shown in FIG. 1.
Figure 3:
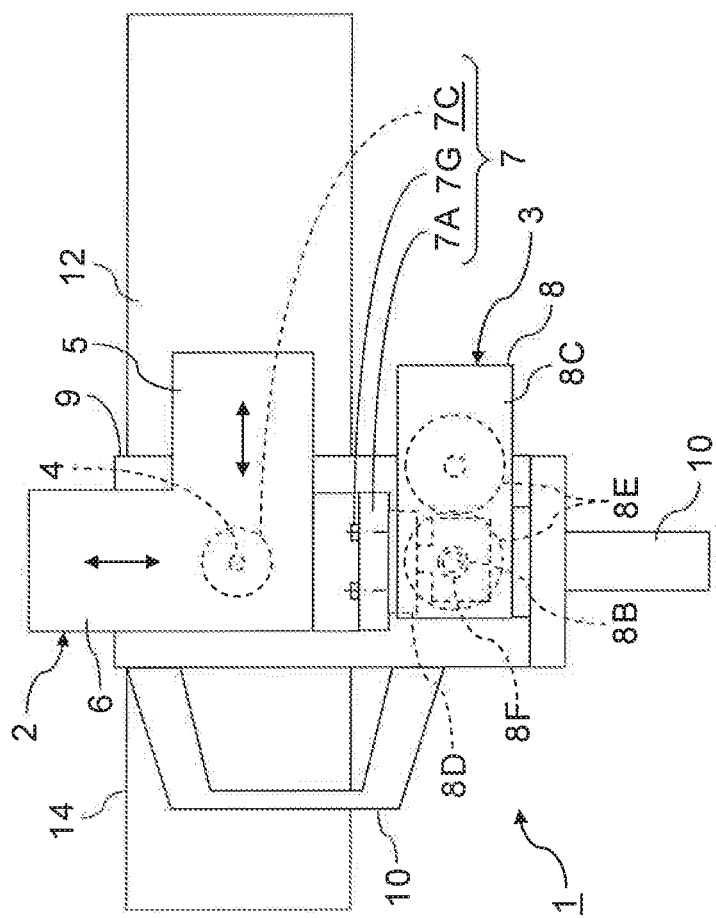
FIG. 3 is a right side view of the hole inspection unit shown in FIG. 1.
Figure 4:
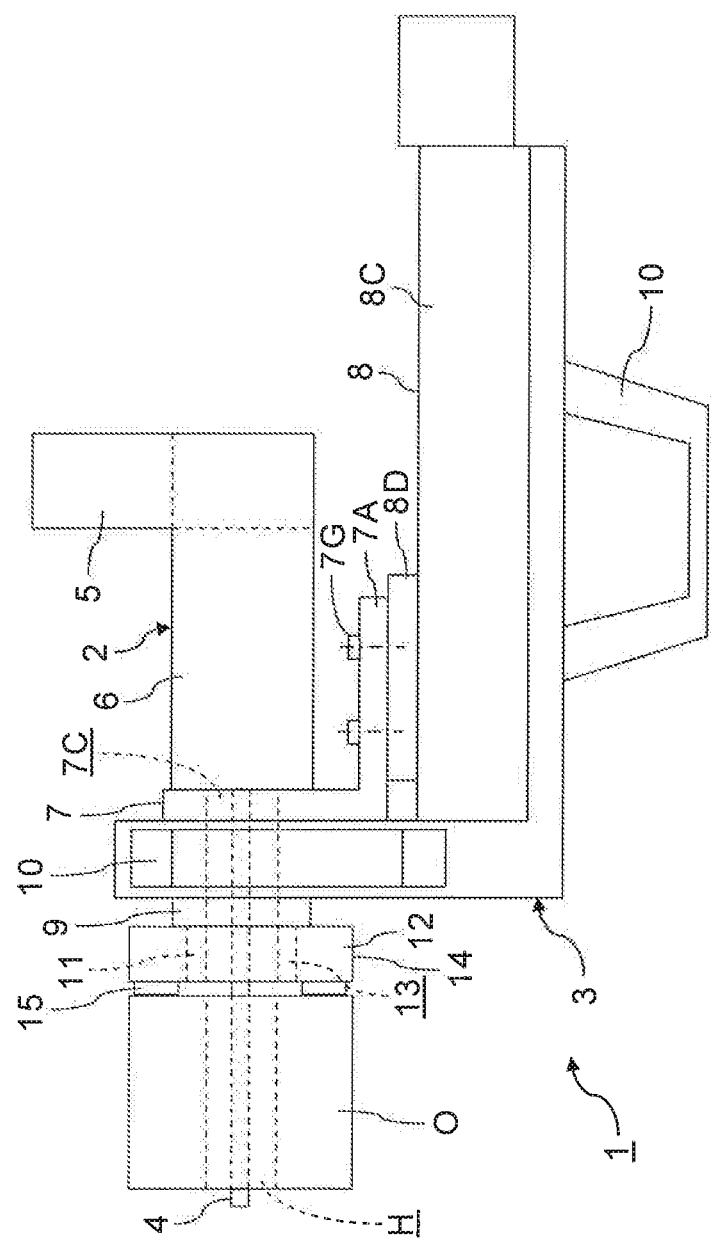
FIG. 4 is a front view of the hole inspection unit shown in FIG. 1 in a state where a hole is being inspected by setting the hole inspection unit.
Figure 5:
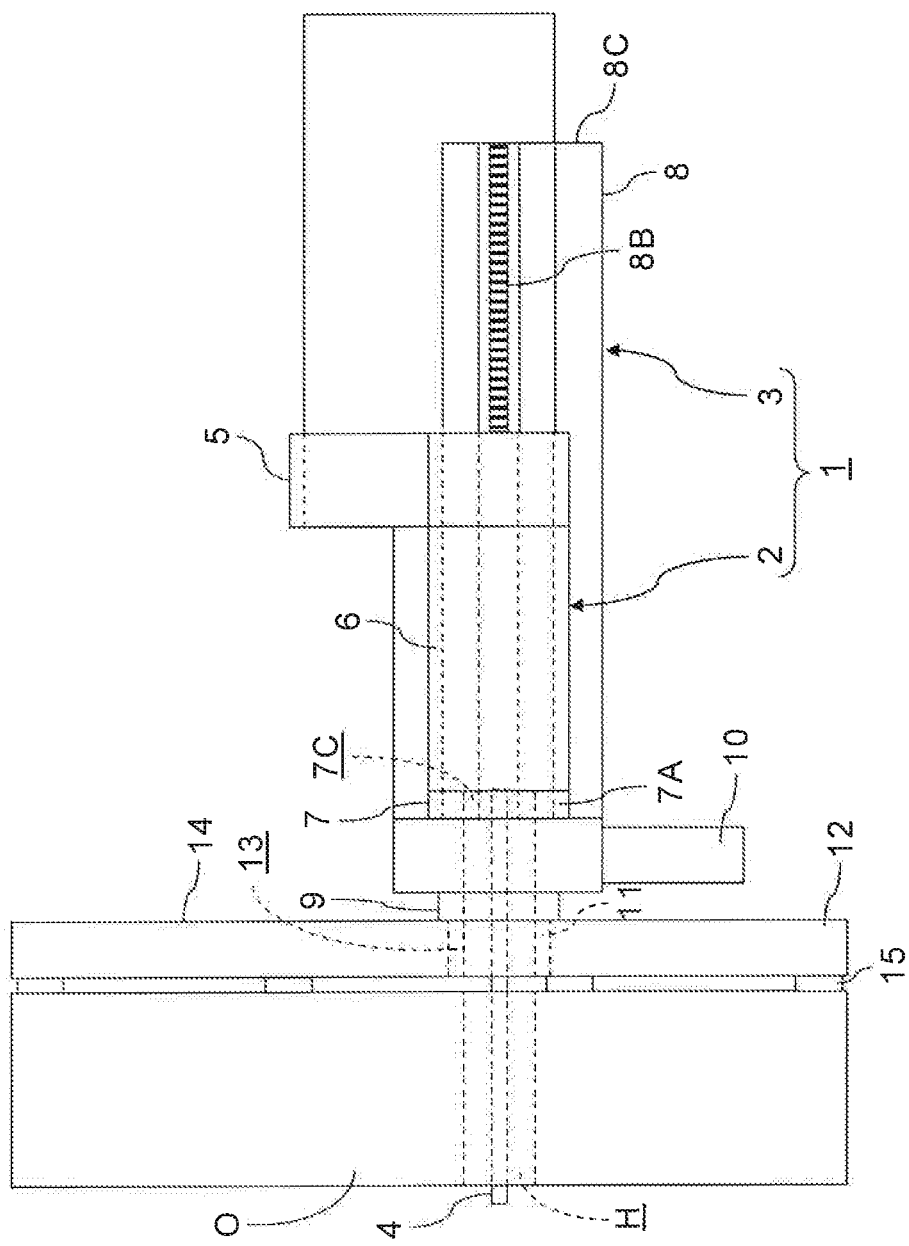
FIG. 5 is a top view of the hole inspection unit shown in FIG. 4.

FIG. 1 is a front view of a hole inspection unit according to the first implementation of the present invention, FIG. 2 is a top view of the hole inspection unit shown in FIG. 1, FIG. 3 is a right side view of the hole inspection unit shown in FIG. 1, FIG. 4 is a front view of the hole inspection unit shown in FIG. 1 in a state where a hole is being inspected by setting the hole inspection unit, and FIG. 5 is a top view of the hole inspection unit shown in FIG. 4.

A hole inspection unit 1 is a handheld device for inspecting at least one feature of a hole H formed in an object O. The hole H to be inspected may be a through hole, or may be a blind hole. Concrete examples of the feature of the hole H to be inspected include diameters at respective depths of the hole H, surface roughness at respective positions on the inside surface of the hole H, the existence of damage on the inside surface of the hole H, and a three dimensional shape of the inside surface of the hole H. In addition, an edge of the hole H may also be inspected regardless of whether the edge has been processed into a chamfered edge, an inverted rounded edge or the like, and/or a step has been formed on the edge. Therefore, not only the shape of the edge, such as a chamfered edge, of the hole H but also a three dimensional shape of the inside surface of the hole H including the shape of the edge may be acquired.

The hole inspection unit 1 has a hole inspection device 2 and a feeding device 3. The hole inspection device 2 inspects the hole H to be inspected of the object O by inserting a probe 4 into the hole H in the central axis direction of the hole H. The probe 4 may be a contact-type probe which contacts with the inside surface of the hole H, or may be a non-contact-type probe which does not contact with the inside surface of the hole H. The typical probe 4 which is to be inserted into the hole H is a bar-shaped probe in many cases. When the bar-shaped probe 4 is an optical probe which oscillates and receives laser light, the central axis of the bar-shaped probe 4 and the central axis of the hole H must be disposed on a same straight line in many cases.

In an illustrated example, the hole inspection device 2 has a two dimensional position adjustment device 5 which moves the bar-shaped probe 4 in two directions orthogonal to each other on a plane normal to the central axis of the probe 4. That is, the position of the probe 4 can be finely adjusted in a direction perpendicular to the central axis by the position adjustment device 5. Therefore, the position of the bar-shaped probe 4 can be finely adjusted so that the central axis of the bar-shaped probe 4 may be on the same straight line as the central axis of the hole H by measuring distances between the inside surface of the hole H and the central axis of the probe 4 by the hole inspection device 2 as long as the probe 4 is inserted into the hole H after the probe 4 has been positioned so that the central axis of the probe 4 may be parallel to the central axis of the hole H.

As a matter of course, the hole inspection device 2 without a function to adjust the position of the probe 4 may be included in the hole inspection unit 1. When the central axis of the bar-shaped probe 4 of the hole inspection device 2 without the function to adjust the position of the probe 4 must be disposed on the same straight line as the central axis of the hole H, the probe 4 must be inserted into the hole H after the probe 4 has been positioned so that the central axis of the probe 4 may be on the same straight line as the central axis of the hole H.

In order to insert the probe 4 into the hole H, it is necessary to reciprocate the probe 4 in the central axis direction of the hole H regardless of the existence of the function to adjust the position of the probe 4 and a shape of the probe 4. For that reason, the hole inspection unit 1 has the feeding device 3 which reciprocates the hole inspection device 2 itself in the central axis direction of the hole H. Accordingly, even when the hole inspection device 2 does not have a function to advance and retreat the probe 4 from and into a casing 6 of the hole inspection device 2, the probe 4 can be reciprocated in the central axis direction of the hole H. In other words, since the casing 6 itself of the hole inspection device 2 can be moved by the feeding device 3, the function to advance and retreat the probe 4 from and into the casing 6 can be omitted. Conversely, when the hole inspection device 2 has the function to advance and retreat the probe 4 from and into the casing 6, the probe 4 may be inserted into the hole H by advancing the probe 4 from the casing 6 after the casing 6 of the hole inspection device 2 has been fed by the feeding device 3.

The feeding device 3 of the hole inspection device 2 can be composed of an attaching jig 7, a movement mechanism 8 and a positioning jig 9. The attaching jig 7 is coupled to the movement mechanism 8. The movement mechanism 8 is coupled to the positioning jig 9. Since the hole inspection unit 1 including the feeding device 3 is handheld, at least one handgrip 10 for carrying the feeding device 3 is attached at a desired position of the feeding device 3. In the illustrated example, the handgrips 10 have been attached on the left side and the lower side respectively, toward the central axis direction of the hole H to be inspected, i.e., a direction for feeding out the inspection device 2, in which a user faces.

The attaching jig 7 is a jig for attaching the hole inspection device 2 at a predetermined position of the feeding device 3. That is, the casing 6 of the hole inspection device 2 is attached to the attaching jig 7. For that purpose, the attaching jig 7 has structure for detaching and attaching the casing 6. When the casing 6 of the hole inspection device 2, which has been sold as a ready-made product, has detachable structure, detachable structure corresponding to that of the casing 6 can be formed in the attaching jig 7. Conversely, when the casing 6 of the hole inspection device 2 does not have detachable structure, an attachment which has detachable structure corresponding to that of the attaching jig 7 can be also added to the casing 6.

Figure 6:
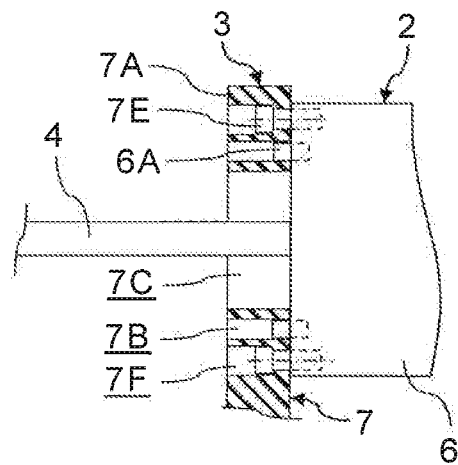
FIG. 6 is a partial longitudinal sectional view showing a concrete example of detachable structure for attaching the casing of the hole inspection device shown in FIG. 1 to the attaching jig.
Figure 7:
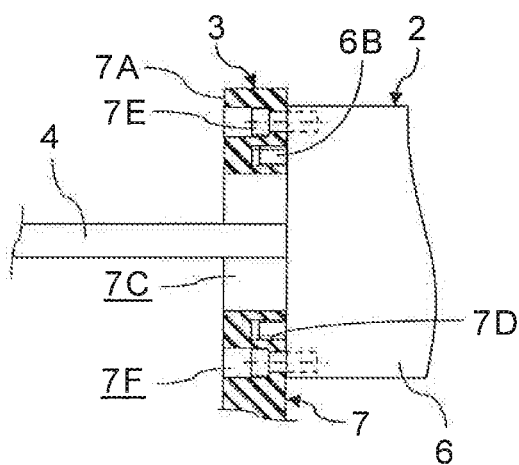
FIG. 7 is a partial longitudinal sectional view showing another concrete example of detachable structure for attaching the casing of the hole inspection device shown in FIG. 1 to the attaching jig.

FIG. 6 is a partial longitudinal sectional view showing a concrete example of detachable structure for attaching the casing 6 of the hole inspection device 2 shown in FIG. 1 to the attaching jig 7, and FIG. 7 is a partial longitudinal sectional view showing another concrete example of detachable structure for attaching the casing 6 of the hole inspection device 2 shown in FIG. 1 to the attaching jig 7.

As a concrete example, when two positioning pins 6A have been fixed to the casing 6 of the hole inspection device 2 or when blind holes for inserting the two positioning pins 6A have been formed on the casing 6 of the hole inspection device 2, as shown in FIG. 6, the attaching jig 7 can be composed of an L-shaped bracket 7A having positioning through holes 7B, for inserting the pins 6A respectively, and a through hole 7C, for passing the probe 4 through, as exemplified by FIG. 1 and the like.

Meanwhile, as another concrete example, when the hole inspection device 2 does not have the function to adjust the position of the probe 4 while a cylindrical male screw 6B surrounding the probe 4 has been fixed to the casing 6 of the hole inspection device 2 as shown in FIG. 7, the attaching jig 7 can be composed of an L-shaped bracket 7A having a female screw 7D for fastening the cylindrical male screw 6B. Alternatively, when a positioning bushing surrounding the probe 4, instead of the cylindrical male screw 6B, has been fixed to the casing 6 of the hole inspection device 2, the attaching jig 7 can be composed of an L-shaped bracket 7A having a through hole for inserting the positioning bushing.

In any case, in order to fix the casing 6 of the hole inspection device 2 to the attaching jig 7 tightly, through holes 7F for respectively passing bolts 7E through may be formed in the attaching jig 7, and the casing 6 may be fixed to the attaching jig 7 with the bolts 7E, as needed. For example, although using pin bolts instead of the pins 6A in the example shown in FIG. 6 makes it possible to firmly fix the casing 6 so that the casing 6 may not fall down from the attaching jig 7, it is realistic to fix the casing 6 to the attaching jig 7 with the bolts 7E in case of using the pins 6A as shown in FIG. 6 or a bushing for positioning. Meanwhile, although fastening the male screw 6B as shown in FIG. 7 can prevent the casing 6 from falling down from the attaching jig 7, it is realistic to fix the casing 6 to the attaching jig 7 with the bolts 7E so that the casing 6 of the hole inspection device 2 may not rotate relative to the attaching jig 7.

Since the structure of the casings 6 may differ from each other between the hole inspection devices 2 as exemplified by FIG. 6 and FIG. 7, the attaching jig 7 may be made exchangeable so that the different hole inspection devices 2 can be used. In the example shown in FIG. 1, the L-shaped bracket 7A can be replaceable from the movement mechanism 8 with screws 7G.

The movement mechanism 8 reciprocates the hole inspection device 2 together with the attaching jig 7 linearly. Therefore, the movement mechanism 8 can be composed of a machine element which moves linearly. Although concrete examples of a linearly moving machine element include an air cylinder, which reciprocates a piston according to pneumatic signals or hydraulic signals, a crawler, such as a chain or a power transmission belt, and linearly moving gears, such as a rack-and-pinion, it is practical to adopt a motor 8A and a ball screw 8B automatically rotated by the motor 8A as illustrated since the movement amount of the hole inspection device 2 can be controlled exactly. Although the motor 8A for rotating the ball screw 8B may be an electric motor, an air motor or a hydraulic motor, it is realistic to use an electric motor or a hydraulic motor from a viewpoint of controlling the movement amount of the hole inspection device 2 exactly and stopping the motor 8A instantly.

Figure 8:
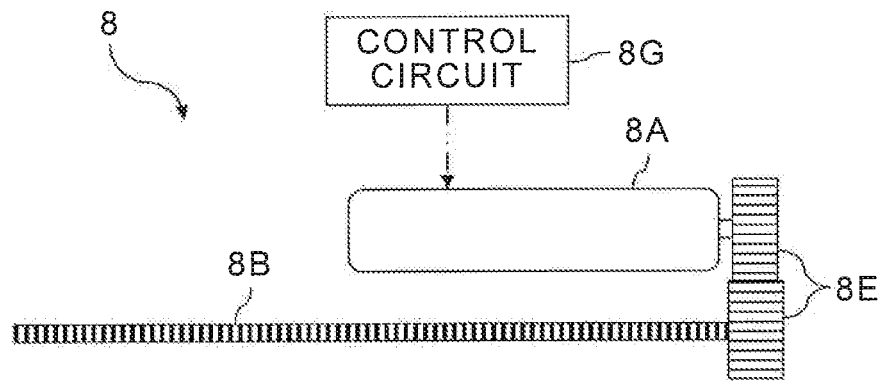
FIG. 8 is a top view of the inside of the casing which shows an example of detailed structure of the movement mechanism shown in FIG. 1.
Figure 9:
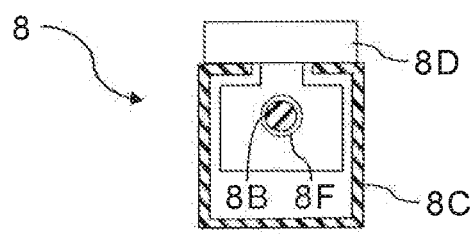
FIG. 9 is a partial cross sectional view of the movement mechanism shown in FIG. 8.

FIG. 8 is a top view of the inside of the casing 8C which shows an example of detailed structure of the movement mechanism 8 shown in FIG. 1, and FIG. 9 is a partial cross sectional view of the movement mechanism 8 shown in FIG. 8.

As exemplified by FIG. 8 and FIG. 9, the movement mechanism 8 can be composed of the electric motor 8A, the ball screw 8B, a casing 8C, for housing the electric motor 8A and the ball screw 8B, and a slider 8D, which moves linearly by rotation of the ball screw 8B. In the example shown in FIG. 8, the output shaft of the motor 8A has been coupled to the input shaft of the ball screw 8B through gears 8E. Therefore, the rotation speed and torque of the output shaft of the motor 8A can be adjusted by the gear ratio of the gears 8E, and thereby the ball screw 8B can be rotated with the appropriate rotation speed and torque. As a matter of course, a power transmission belt which moves by pulleys may be used instead of the gears 8E.

The casing 8C A has a slit whose length direction is parallel to that of the ball screw 8B, and a part of the slider 8D is disposed inside the casing 8C. The part of the slider 8D disposed inside the casing 8C has a female screw 8F which is fastened to the ball screw 8B. Meanwhile, the attaching jig 7, such as the L-shaped bracket 7A, is fixed to the other part of the slider 8D disposed outside the casing 8C.

Therefore, when the torque output from the output shaft of the motor 8A is transmitted to the input shaft of the ball screw 8B through the gears 8E, and thereby the ball screw 8B is normally rotated, the attaching jig 7 and the hole inspection device 2 move forward together with the slider 8D. Meanwhile, when the ball screw 8B is reversely rotated, the attaching jig 7 and the hole inspection device 2 move backward together with the slider 8D.

When the hole inspection device 2 is moved by the ball screw 8B, the position of the probe 4 in the central axis direction is determined by the rotation amounts of the ball screw 8B and the motor 8A. Therefore, in order to move the probe 4 to an intended position exactly for inspecting the hole H, it is important to control the rotation amount of the motor 8A precisely. In addition, in order to control the speed of the probe 4 in the central axis direction to a predetermined speed, like a case of advancing the probe 4 at a constant speed while rotating the probe 4 around the central axis of the probe 4 at a constant rotation speed, it is important to control the rotation speed of the motor 8A precisely.

For that reason, the motor 8A of the movement mechanism 8 can be automatically controlled by a control circuit 8G, such as a computer. Specifically, the motor 8A can be automatically controlled by a control program in which rotation conditions of the motor 8A including the rotation start time, the rotation amount, the rotation speed, the rotation direction and the rotation stop time have been defined beforehand. Thereby, the hole inspection device 2 can be automatically reciprocated linearly by the ball screw 8B rotated by the motor 8A.

Conversely, the position of the probe 4 in the feeding direction can be specified based on the rotation amount of the motor 8A. Therefore, it becomes possible to specify each inspection position of the feature of the hole H so long as the rotation amount of the motor 8A and time are recorded by the control circuit 8G and are related to acquired time of the inspection data of the hole H, acquired in the hole inspection device 2. In other words, the feature at each position of the hole H can be inspected.

Starting and stopping rotation of the motor 8A require acceleration and deceleration respectively. Accordingly, the rotation speed of the motor 8A may be controlled by the control circuit 8G so that the rotation speed of the motor 8A may change smoothly. For example, control signals of the motor 8A can be generated or smoothing processing of the waveform of at least one control signal of the motor 8A can be performed so that the change amount per unit time of the rotation speed of the output shaft of the motor 8A may be not more than a certain value. Thereby, a vibration of the hole inspection device 2 and the probe 4 caused by an extreme change in the rotation speed of the motor 8A can be reduced, and the deterioration in the inspection accuracy of the hole H can be avoided.

Moreover, it is appropriate to determine an initial position of the probe 4 so that an inspection of the hole H may be started after the rotation speed of the motor 8A and the moving speed of the probe 4 have become constant. Specifically, it is appropriate to dispose the tip of the probe 4 away from the hole H by a certain distance in the moving direction of the probe 4 in a state where the probe 4 has been retreated to the initial position. In case of using the typical electric motor 8A, the probe 4 can be inserted into the hole H after the rotation speed of the motor 8A and the movement speed of the probe 4 have become constant as long as the distance between the tip of the probe 4 in the retreated position and the hole H are 20 mm to 30 mm. That is, feeding out the probe 4 from a position away from the surface of the object O by 20 mm to 30 mm allows feeding the probe 4 at a constant speed inside the hole H.

The distance between the hole H and the position of the tip of the probe 4 which has been moved to the retreat position can be also adjusted by the positioning jig 9 in addition to the length of the ball screw 8B. The positioning jig 9 is a jig for positioning the whole hole inspection unit 1 including the movement mechanism 8 relative to the object O so that the moving direction of the attaching jig 7 and the hole inspection device 2 may become parallel to the central axis direction of the hole H.

Although two pins or two pin bolts may be used as elements of the positioning jig 9, using a bushing 11 as an element of the positioning jig 9 allows positioning of the hole inspection unit 1 using a drilling jig 12 for positioning a drilling tool, such as a drill or a reamer, for processing the hole H on the object O. That is, the drilling jig 12, such as a drilling plate, has a positioning hole 13. Accordingly, inserting the bushing 11 into the positioning hole 13 formed in the drilling jig 12 makes it possible to position the whole hole inspection unit 1 including the movement mechanism 8 relative to the hole H of the object O with high precision.

That is, the drilling jig 12, such as a drilling plate, which has been attached to the object O can be used as it is, as a positioning plate 14 for positioning the hole inspection unit 1. Accordingly, as soon as the hole H has been processed on the object O by a drilling tool, the hole H can be inspected promptly, and the following processing or treatment can be started.

As a matter of course, when the drilling jig 12 is not attached to the object O, the positioning plate 14 having the positioning hole 13 for inserting the bushing 11 can be prepared as a part of the positioning jig 9. The positioning plate 14 is a jig, having the positioning hole 13 which the bushing 11 slidably fits, used by being attached to the object O so that the central axis of the positioning hole 13 may lie on the same straight line as the central axis of the hole H to be inspected of the object O. The positioning plate 14 can be attached to the object O by fixing the positioning plate 14 to the object O with pin-shaped clamps, each utilizing another through hole on the object O, or clamps, each sandwiching end parts of the object O and the positioning plate 14.

The positioning plate 14 may be disposed in contact with the surface of the object O. Conversely, a clearance may be generated between the positioning plate 14 and the object O so that at least one feature, such as surface roughness and/or a shape, of the edge of the hole H of the object O can be inspected. For that purpose, at least one plate-like spacer 15 composed of a disk-like plate or the like may be disposed on the object O side of the positioning plate 14 so that a clearance may be generated between the positioning plate 14 and the object O as illustrated, and thereby the edge of the hole H to be inspected of the object O may be exposed to the clearance.

As a concrete example, when the hole inspection device 2 is an optical scanner having the bar-shaped probe 4 which irradiates laser light in a radial direction of the hole H, no clearance between the positioning plate 14 and the object O may cause false recognition of inspected feature of the positioning hole 13 of the positioning plate 14 as a part of inspection data of the hole H. On the other hand, when the positioning plate 14 and the object O are spaced, feature of the positioning hole 13 possibly acquired as a part of inspection data can be distinguished from inspection data of the hole H since the positioning hole 13 of the positioning plate 14 and the hole H to be inspected are discontinuous.

Note that, when the probe 4 of the hole inspection device 2 has a rod-shape and is moved in the length direction in the bushing 11 which is an element of the positioning jig 9 as illustrated, the attaching jig 7 positions the hole inspection device 2 so that the length direction of the rod-shaped probe 4 of the hole inspection device 2 may be on a straight line, passing through the inside of the bushing 11, parallel to the central axis of the bushing 11. In particular, when the bar-shaped probe 4 of the hole inspection device 2 must be fed out on the central axis of the hole H, the attaching jig 7 positions the hole inspection device 2 so that the length direction of the bar-shaped probe 4 of the hole inspection device 2 and the central axis of the bushing 11 may be on the same straight line. Meanwhile, the movement mechanism 8 linearly reciprocates the bar-shaped probe 4 inside the bushing 11 by reciprocating the attaching jig 7 and the hole inspection device 2 in the central axis direction of the bushing 11.

As mentioned above, the handheld hole inspection device 2 can be attached to the attaching jig 7 while the movement mechanism 8 which linearly reciprocates the hole inspection device 2 together with the attaching jig 7 can be positioned relative to the object O by the positioning jig 9 so that the moving direction of the attaching jig 7 and the hole inspection device 2 may be parallel to the central axis direction of the hole H. Thereby, the hole inspection device 2 can be fed out by linearly advancing the hole inspection device 2 together with the attaching jig 7 toward the object O by the movement mechanism 8. Further, the probe 4 can be inserted into the hole H to be inspected of the object O in the central axis direction of the hole H by the above-mentioned method of feeding the hole inspection device 2, and then the hole H can be inspected by the hole inspection device 2.

(Effects)

According to the hole inspection unit 1, the feeding device 3 of the hole inspection device 2 and the method of feeding the hole inspection device 2 as described above, at least one feature, such as surface roughness and/or a shape, of the inside surface of the hole H to be inspected can be inspected without setting the object O having the hole H on a three dimensional measuring device or the like. That is, since the whole hole inspection unit 1 is handheld, the hole H can be inspected easily by carrying the hole inspection unit 1 to a work site or the like instead of moving the object O.

Furthermore, the hole inspection device 2 can be positioned relative to the hole H of the object O exactly by the attaching jig 7 and the positioning jig 9 while the hole inspection device 2 can be automatically fed by the movement mechanism 8. Thereby, the degradation in inspection accuracy caused by making the hole inspection unit 1 be a handheld type can be avoided.

(Second Implementation)

Figure 10:
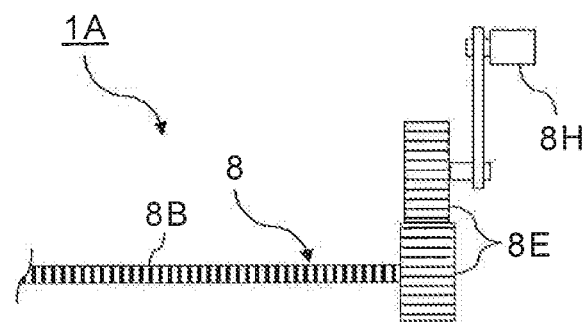
FIG. 10 is a top view, showing an example of structure, of a movement mechanism included in the hole inspection unit according to the second implementation of the present invention.

FIG. 10 is a top view, showing an example of structure, of a movement mechanism included in the hole inspection unit according to the second implementation of the present invention.

A hole inspection unit 1A in the second implementation shown in FIG. 10 is different from the hole inspection unit 1 in the first implementation in the respect that the movement mechanism 8 is configured to reciprocate the attaching jig 7 and the hole inspection device 2 manually. Other structure and actions of the hole inspection unit 1A in the second implementation are not substantially different from those of the hole inspection unit 1 in the first implementation. Therefore, only machine parts coupled to the ball screw 8B disposed in the casing 8C of the movement mechanism 8 are illustrated, and the same signs are attached to the same elements or the corresponding elements while explanation thereof will be omitted.

The movement mechanism 8 may be driven manually. As a concrete example, when the hole inspection device 2 is reciprocated by the ball screw 8B, the ball screw 8B may be rotated by a handle 8H which is operated manually. When the hole inspection device 2 is reciprocated manually, it becomes unnecessary to include a power source for reciprocating the hole inspection device 2 in the hole inspection unit 1A. Therefore, it is useful from a viewpoint of simplifying structure of the hole inspection unit 1A when it is not important to control the feeding speed of the probe 4, for example, like when the probe 4 is a contact type.

(Other Implementations)

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A feeding device of a hole inspection device having a probe, the probe being inserted into a hole to be inspected of an object in a central axis direction of the hole, for inspecting the hole,
   the feeding device comprising:
   an attaching jig for attaching the hole inspection device to the feeding device;
   a movement mechanism having a linearly moving machine element which is at least one of an air cylinder, a crawler, gears and a ball screw, the linearly moving machine element linearly reciprocating the hole inspection device together with the attaching jig; and
   a positioning jig that positions the movement mechanism to the object, a moving direction of the attaching jig and the hole inspection device being made parallel to the central axis direction of the hole by positioning the movement mechanism.

2. The feeding device according to claim 1,
   wherein the probe is bar-shaped,
   the positioning jig includes a bushing,
   the attaching jig is adapted to position the hole inspection device, a length direction of the bar-shaped probe being made to be on a straight line which passes through an inside of the bushing and is parallel to a central axis of the bushing, and
   the linearly moving machine element is adapted to linearly reciprocate the bar-shaped probe inside the bushing by reciprocating the attaching jig in a central axis direction of the bushing.

3. The feeding device according to claim 2, further comprising:
   a positioning plate having a positioning hole for inserting the bushing, the bushing slidably fitting to the positioning hole, the positioning plate being attached to the object in a state where a central axis of the positioning hole and the central axis of the hole to be inspected lie on a same straight line; and
   a spacer disposed in an object side of the positioning plate, the spacer generating a clearance between the positioning plate and the object, an edge of the hole to be inspected being exposed in the clearance.

4. The feeding device according to claim 1,
   wherein the movement mechanism includes the ball screw and a motor rotating the ball screw, the ball screw automatically reciprocating the hole inspection device.

5. The feeding device according to claim 1,
   wherein the movement mechanism includes the ball screw and a handle manually rotating the ball screw, the ball screw reciprocating the hole inspection device.

6. The feeding device according to claim 1,
   further comprising a handgrip for carrying the feeding device,
   wherein the feeding device is handheld.

7. A hole inspection unit comprising:
   the feeding device according to claim 1; and
   the hole inspection device.

8. A method of feeding a hole inspection device having a probe, for inspecting a hole to be inspected of an object by inserting the prove in a central axis direction of the hole,
   the method comprising:
   attaching the hole inspection device to an attaching jig;
   positioning a movement mechanism to the object by a positioning jig, the movement mechanism having a linearly moving machine element which is at least one of an air cylinder, a crawler, gears and a ball screw, the linearly moving machine element linearly reciprocating the hole inspection device together with the attaching jig, a moving direction of the attaching jig and the hole inspection device being made parallel to the central axis direction of the hole by positioning the movement mechanism; and
   feeding the hole inspection device by linearly advancing the attaching jig together with the hole inspection device toward the object by the movement mechanism.

9. The method according to claim 8,
   wherein the positioning jig includes a bushing; and
   the movement mechanism is positioned by inserting the bushing into a positioning hole formed on a drilling jig for positioning a drilling tool for processing the hole.

10. The feeding device according to claim 2,
    wherein the movement mechanism includes the ball screw and a motor rotating the ball screw, the ball screw automatically reciprocating the hole inspection device.

11. The feeding device according to claim 3,
    wherein the movement mechanism includes the ball screw and a motor rotating the ball screw, the ball screw automatically reciprocating the hole inspection device.

12. The feeding device according to claim 2,
    further comprising a handgrip for carrying the feeding device,
    wherein the feeding device is handheld.

13. The feeding device according to claim 3,
    further comprising a handgrip for carrying the feeding device,
    wherein the feeding device is handheld.

14. The feeding device according to claim 4,
    further comprising a handgrip for carrying the feeding device,
    wherein the feeding device is handheld.

15. A hole inspection unit comprising:
    the feeding device according to claim 2; and
    the hole inspection device.

16. A hole inspection unit comprising:
    the feeding device according to claim 3; and
    the hole inspection device.

17. A hole inspection unit comprising:
    the feeding device according to claim 4; and
    the hole inspection device.

18. A hole inspection unit comprising:
    the feeding device according to claim 6; and
    the hole inspection device.

19. The method according to claim 8,
wherein the movement mechanism includes the ball screw and a motor rotating the ball screw, the ball screw automatically reciprocating the hole inspection device.

20. The method according to claim 8,
wherein the feeding device is handheld and has a handgrip for carrying the feeding device.

\* \* \* \* \*